(12) United States Patent
Farley (10) Patent No.: US 11,458,487 B2
(45) Date of Patent: *Oct. 4, 2022

(54) FILTERED SHOWERHEAD WITH MULTIPLE NOZZLE ASSEMBLIES

(71) Applicant: David K. Farley, Corona, CA (US)

(72) Inventor: David K. Farley, Corona, CA (US)

( * ) Notice: Subject to any disclaimer, the term of this patent is extended or adjusted under 35 U.S.C. 154(b) by 442 days.

This patent is subject to a terminal disclaimer.

(21) Appl. No.: 16/570,696

(22) Filed: Sep. 13, 2019

(65) Prior Publication Data

US 2020/0384485 A1 Dec. 10, 2020

Related U.S. Application Data

(63) Continuation-in-part of application No. 29/694,016, filed on Jun. 6, 2019, now Pat. No. Des. 903,049.

(51) Int. Cl.
  *B05B 1/18* (2006.01)
  *B05B 15/40* (2018.01)
  *C02F 1/00* (2006.01)

(52) U.S. Cl.
  CPC ............... *B05B 1/18* (2013.01); *B05B 15/40* (2018.02); *C02F 1/003* (2013.01); *C02F 2201/006* (2013.01); *C02F 2307/06* (2013.01); *E03C 2201/40* (2013.01)

(58) Field of Classification Search
  CPC . B05B 1/18; B05B 1/185; B05B 15/40; C02F 1/003; C02F 2201/006; C02F 2307/06; E03C 2201/40
  See application file for complete search history.

(56) References Cited

U.S. PATENT DOCUMENTS

| 5,152,464 | A | 10/1992 | Farley |
| 5,300,224 | A | 4/1994 | Farley |
| 5,503,742 | A | 4/1996 | Farley |
| 6,016,977 | A | 1/2000 | Farley |
| 6,187,187 | B1 | 2/2001 | Farley |
| 6,214,224 | B1 | 4/2001 | Farley |
| 6,270,023 | B1 | 8/2001 | Farley |
| 6,325,930 | B2 | 12/2001 | Farley |
| 6,537,455 | B2 | 3/2003 | Farley |
| 9,504,940 | B2 | 11/2016 | Farley |
| 2002/0113145 | A1* | 8/2002 | Wong ................ B05B 15/5225 239/562 |
| 2004/0056123 | A1* | 3/2004 | Douglas ............... B05B 1/1654 239/587.4 |

(Continued)

*Primary Examiner* — Darren W Gorman
(74) *Attorney, Agent, or Firm* — Stetina Brunda Garred & Brucker (57) ABSTRACT

A multi-mode showerhead having a housing with a front and a rear and an offset integrated water filter system incorporated into the showerhead. The multi-mode offset filtered showerhead has multiple nozzle assemblies, one of which is movable or rotatable and another of which is removable and may contain a unit to hold a water filter cartridge for insertion and removal from the integrated water filter system incorporated into the showerhead. A selector switch and other water flow control devices are used to selectively control the flow of water through the showerhead to the nozzle assemblies. The showerhead is mounted on a shower arm by way of a single water inlet on the rear of the housing and is fluidly connected to a hollow filter chamber in the integrated water filter system.

10 Claims, 10 Drawing Sheets

(56) References Cited

U.S. PATENT DOCUMENTS

| | | | |
|---|---|---|---|
| 2008/0121293 A1* | 5/2008 | Leber | F16K 11/076 |
| | | | 137/597 |
| 2008/0295242 A1* | 12/2008 | Tsai | B05B 1/18 |
| | | | 4/615 |
| 2010/0213282 A1* | 8/2010 | Peel | B05B 1/185 |
| | | | 239/390 |
| 2015/0008270 A1* | 1/2015 | Yin | B05B 12/002 |
| | | | 239/442 |
| 2017/0165682 A1* | 6/2017 | Lin | B05B 1/18 |
| 2017/0165684 A1* | 6/2017 | Lin | E03C 1/0409 |
| 2017/0165685 A1* | 6/2017 | Lin | B05B 1/1627 |
| 2017/0165686 A1* | 6/2017 | Lin | E03C 1/0408 |
| 2017/0167121 A1* | 6/2017 | Lin | B05B 1/1636 |
| 2017/0173603 A1* | 6/2017 | Lin | B05B 1/1636 |
| 2019/0162321 A1* | 5/2019 | Huang | F16K 31/52416 |
| 2019/0184316 A1 | 6/2019 | Farley | |

* cited by examiner

FILTERED SHOWERHEAD WITH MULTIPLE NOZZLE ASSEMBLIES

CROSS-REFERENCE TO RELATED APPLICATIONS

This application is a continuation-in-part of application Ser. No. 29/694,016, filed Jun. 6, 2019.

BACKGROUND OF THE INVENTION

1. Field of the Invention

This invention generally relates to multi-mode filtered showerheads and, more particularly, to an offset filtered multi-mode showerhead having multiple nozzle assemblies

2. Description of the Prior Art

Shower filters for use in conjunction with showerheads and multi-mode filtered showerheads for use in showers are known. One such multi-mode filtered showerhead assembly is set forth in U.S. patent application Ser. No. 15/848,565, filed on Dec. 20, 2017, to Farley ("'565"). This application discloses a multi-mode showerhead having a first fixed nozzle assembly and at least a second, removable shower nozzle assembly. The removable nozzle assembly is placed over an offset hollow water filter chamber in the showerhead to provide a multi-mode offset filtered showerhead with multiple nozzle assemblies that may be selectively controlled to provide filtered water through either or both of the nozzle assemblies, as desired by a user. A water filter cartridge is inserted into and removed from the hollow filter chamber in the showerhead by removing the second, removable shower nozzle assembly from a front opening in the water filter housing.

Although the known showerhead works satisfactorily, there still exists a need in the art for an unique modern showerhead and water filter system with a plurality of shower nozzle assemblies, including a removable nozzle assembly and a movable or rotatable shower nozzle assembly for an even more enjoyable showering experience. The water flow in such a showerhead to the nozzle assemblies may be selectively controlled to provide a diverse flow of filtered water. The showerhead is also configured to allow a water filter cartridge to be easily added to or removed from a water filter housing at one end, by removing the removable nozzle assembly inserted and held in the water filter housing portion of the showerhead.

SUMMARY OF THE INVENTION

The filtered showerhead of the present invention provides many advantages including, but not limited to the following:

1) Minimizes showerhead extension by use of an offset shower water filter system placed at one end of a showerhead having multiple nozzle assemblies, one of which is movable.

2) Front loading of a replacement water filter cartridge in the showerhead by removal of a front facing removable shower nozzle assembly which may have a water filter cartridge holding means integral with the removable shower nozzle assembly.

3) The filtered showerhead of the present invention provides multiple nozzle assemblies with easy adjustment of the spray patterns to and from these nozzle assemblies, as well as having one nozzle assembly that may be rotated, thereby allowing a unique and optimum water flow pattern directed by the user, so as to provide a more enjoyable shower experience.

4) The filtered showerhead of the present invention provides multiple nozzle assemblies with one of the nozzle assemblies being movable or rotatable to allow easy adjustment of such nozzle assembly, thereby allowing a user to direct the water flow from the movable nozzle assembly to a desired location or area.

Accordingly, it is a general object of the present invention to provide an improved showerhead and filter assembly. It is a more particular object of the present invention to provide a showerhead having an offset water filter system. It is a further object of the present invention to provide a showerhead and filter assembly with multiple nozzle assemblies. It is yet another object of the present invention to provide an offset filtered showerhead with multiple nozzle assemblies, one of which is a removable, while another is movable or rotatable. It is a still further object of the present invention to provide a novel offset filtered showerhead in which the removable nozzle assembly allows easy replacement of a water filter cartridge. It is yet a further object of the present invention to provide a novel offset filtered showerhead that has an integrated design which is more aesthetically pleasing, provides a more diverse and enjoyable shower experience and allows access to a filter cartridge by the removal of a front facing removable shower nozzle.

In accordance with one aspect of the present invention there is provided, a multi-mode offset filtered showerhead having multiple spray shower nozzle assemblies, one of which is movable or rotatable and the another of which is removable and may contain a unit to hold a filter cartridge for insertion and removable from the integrated water filter system incorporated into the showerhead.

BRIEF DESCRIPTION OF THE DRAWINGS

The objects and features of the present invention, which are believed to be novel, are set forth with particularity in the appended claims. The present invention, both as to its organization and manner of operation, together with further objects and advantages, may best be understood by reference to the following description, taken in connection with the accompanying drawings, wherein:

DESCRIPTION OF THE PREFERRED EMBODIMENTS

The following description is provided to enable any person skilled in the art to make and use the invention and sets forth the best modes contemplated by the inventor of carrying out his invention. Various modifications, however, will remain readily apparent to those skilled in the art, since the generic principles of the present invention have been defined herein specifically to provide for a multi-mode showerhead having an offset integrated water filter assembly and multiple shower spray nozzle assemblies.

The multi-mode showerhead having multiple spray nozzle assemblies (or spray-heads) and an offset integrated water filter system of the present invention is mounted directly on a regular shower arm coming out of a shower wall (not shown), and is normally screwed onto or otherwise sealingly secured to the shower arm and extending into a shower area.

Turning now to the drawings, FIGS. 1-8 illustrate a currently preferred embodiment of a multi-mode showerhead 10 having an offset integrated water filter system incorporated in the showerhead. The showerhead 10 includes a multi-piece hollow main body or housing 12 with a rear face, portion, or surface 14 and a front face, portion, or surface 16. The body 12 has a single water inlet 18, which is preferably movable, and a plurality of water outlets having spray nozzle assemblies therein. The body is substantially hollow or incudes passages for water therein and could, if desired include additional nozzles. As shown, the housing 12 has a first spray nozzle assembly 20 removably held in the front face 16 at a first end 22 of the showerhead 10. This first spray nozzle assembly 20 is mechanically fixed in place in a hollow chamber 23 formed in the showerhead comprising part of the water filter system, but may be removed, as needed, to replace a filter cartridge, as explained more fully below.

Figure 1:
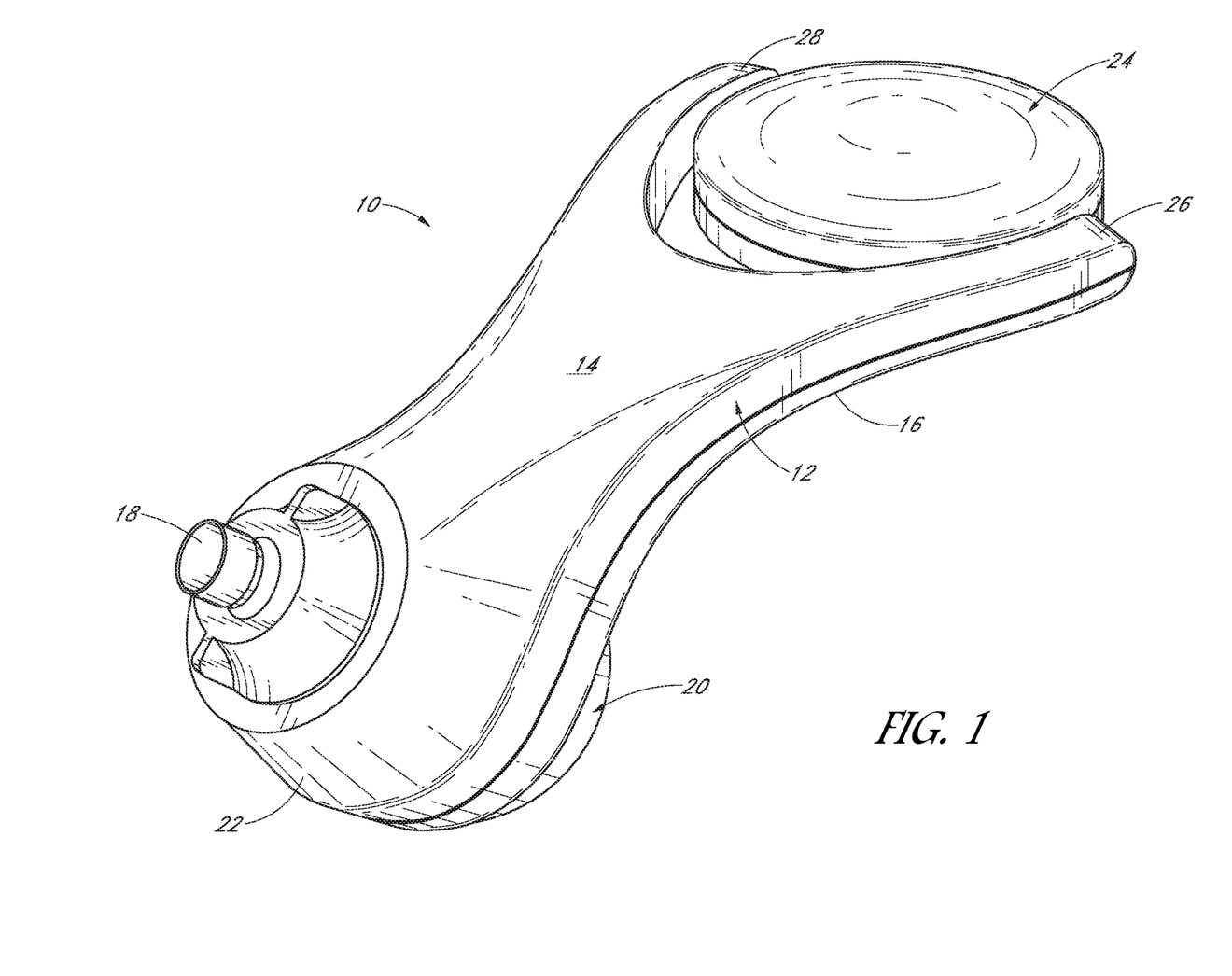
FIG. 1 is a rear perspective view of a multi-mode showerhead having multiple spray nozzle assemblies and an offset integrated water filter system, illustrating the present invention.
Figure 2:
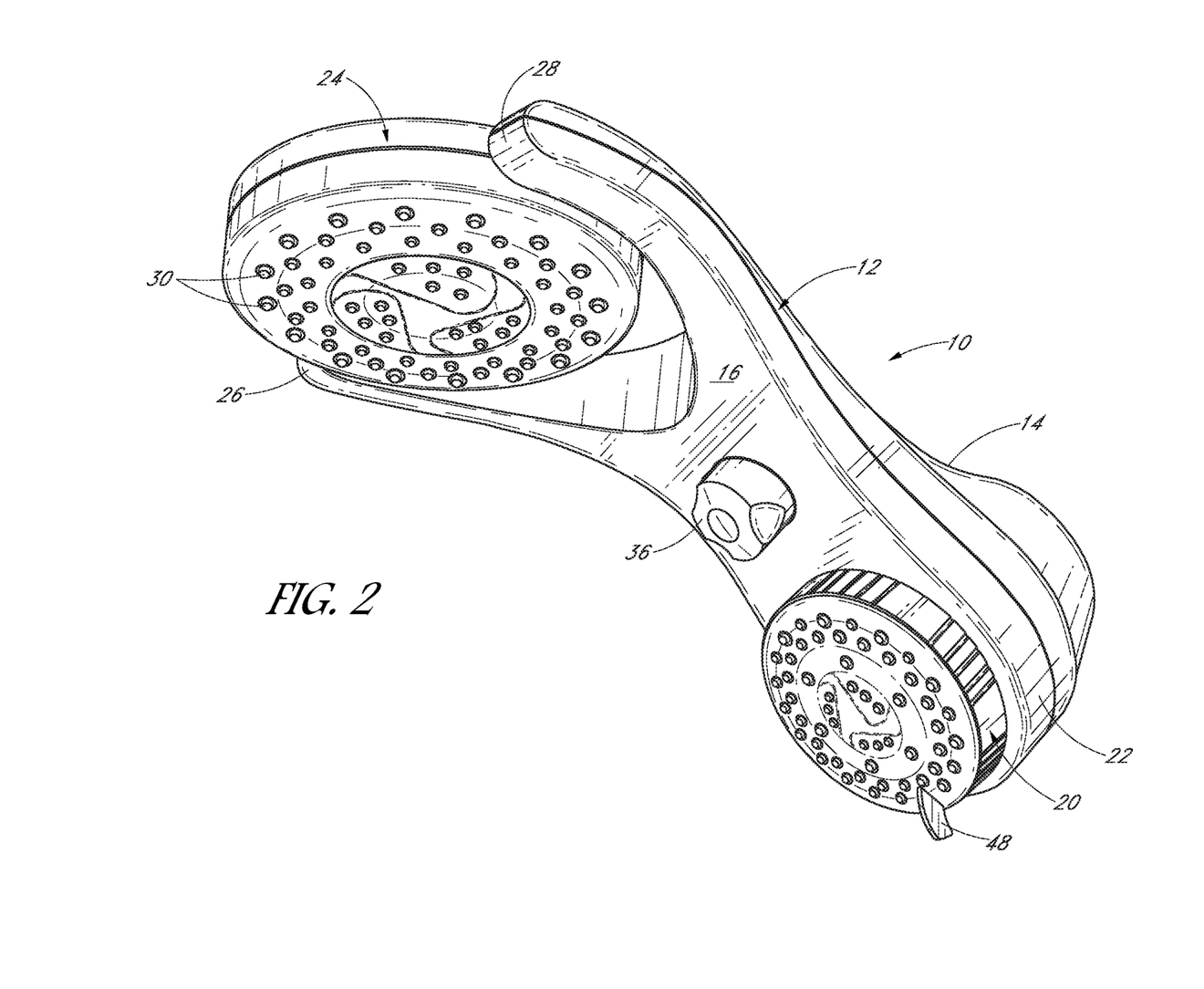
FIG. 2 is a front perspective view of the showerhead of FIG. 1, showing two spray nozzle assemblies and a selector knob or switch between the spray nozzle assemblies.
Figure 3:
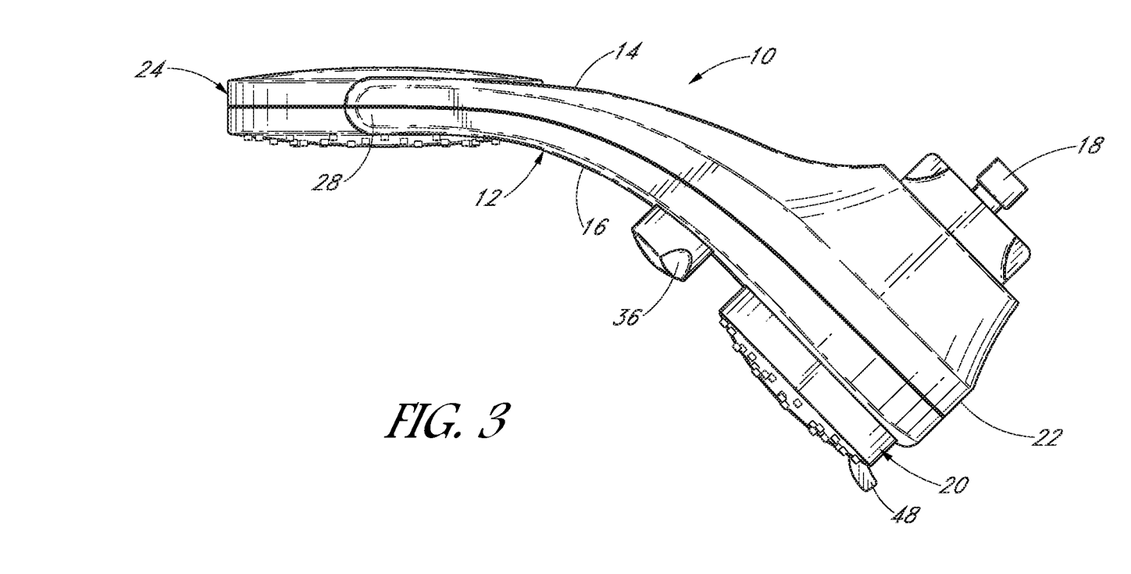
FIG. 3 is a right side elevational view of the showerhead of the present invention, the other side being substantially identical.
Figure 4:
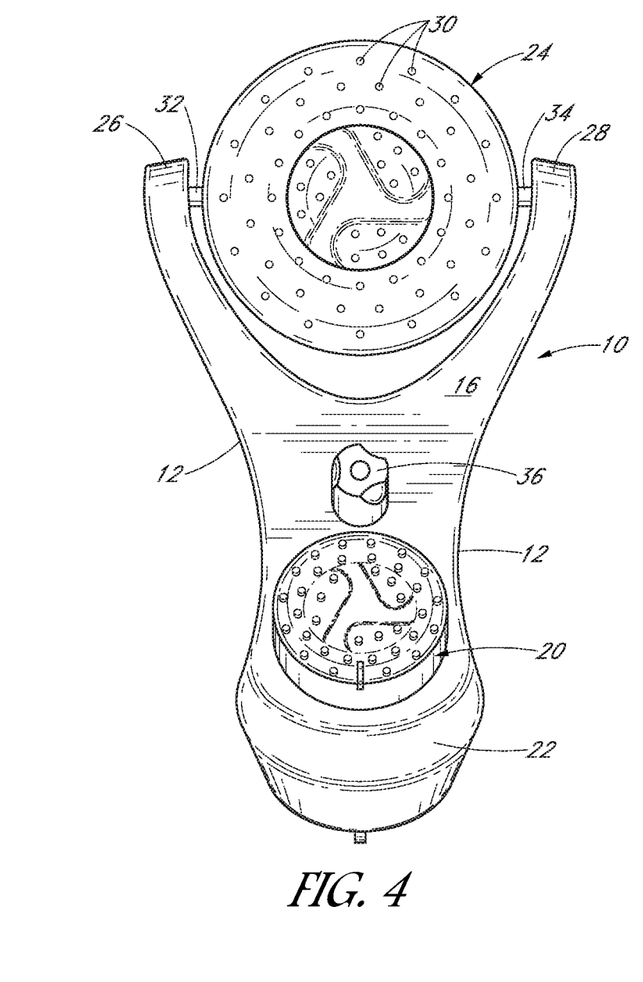
FIG. 4 is a bottom plan view of the showerhead of the present invention.
Figure 5:
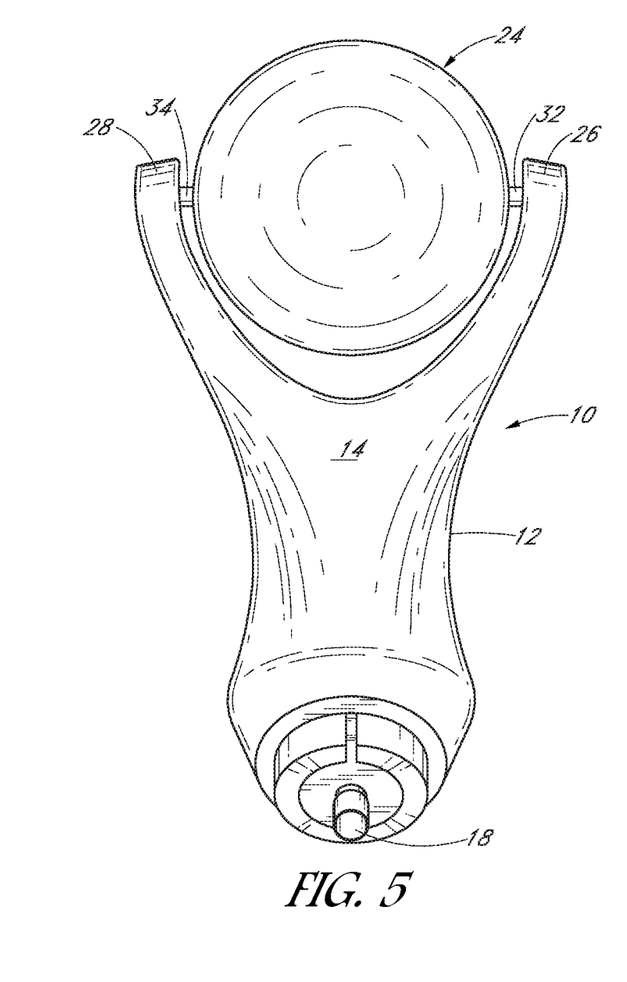
FIG. 5 is a top plan view of the showerhead of the present invention.
Figure 6:
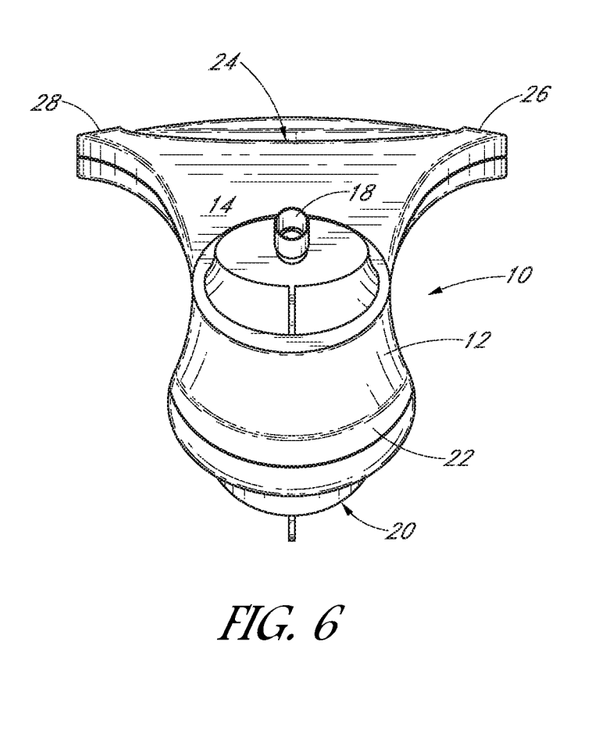
FIG. 6 is a first end elevational view of the showerhead of the present invention.
Figure 7:
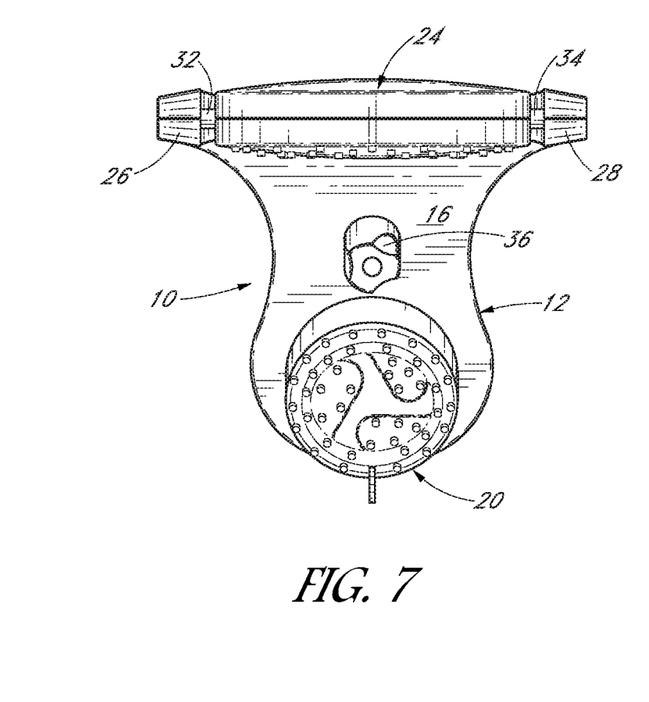
FIG. 7 is a second end elevational view of the showerhead of the present invention.
Figure 8:
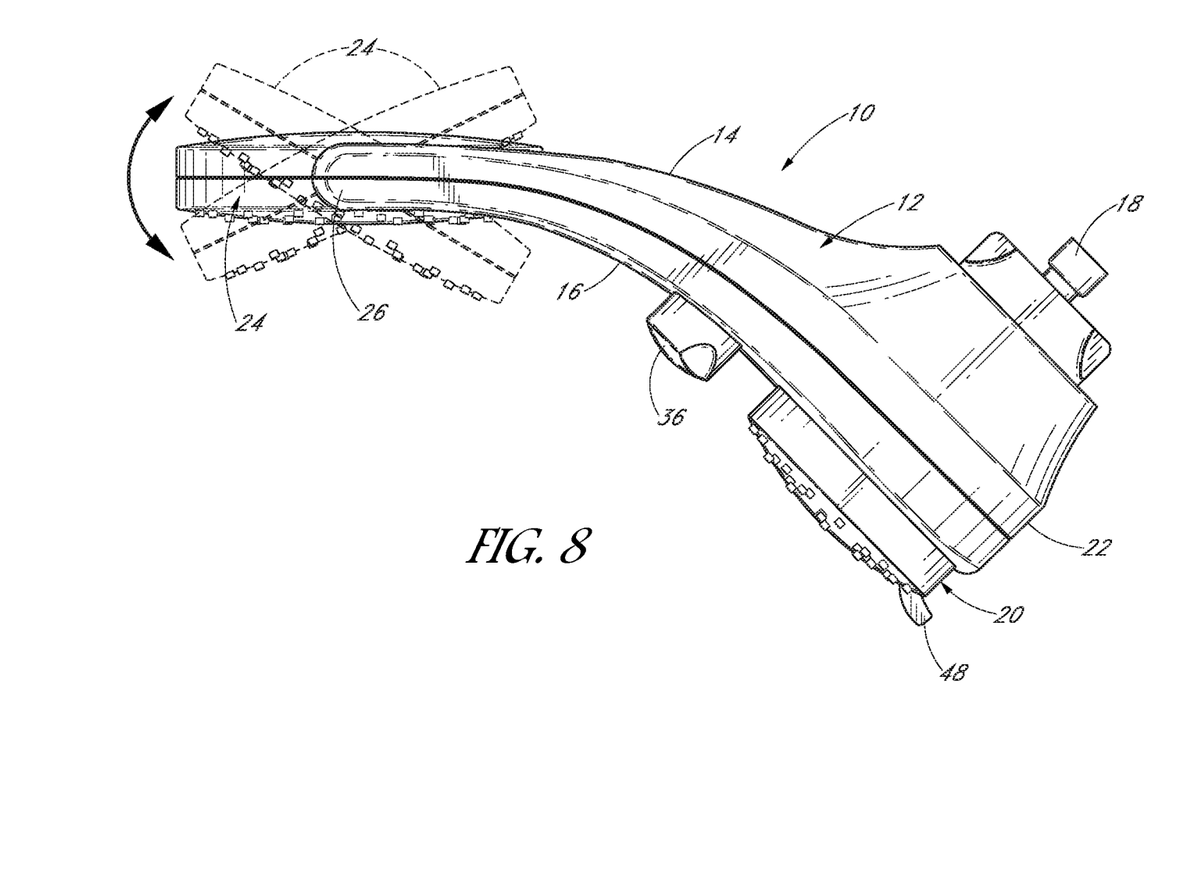
FIG. 8 is a right side elevational view of the showerhead of the present invention with a rotatable nozzle assembly shown rotated into various positions in broken line.
Figure 9:
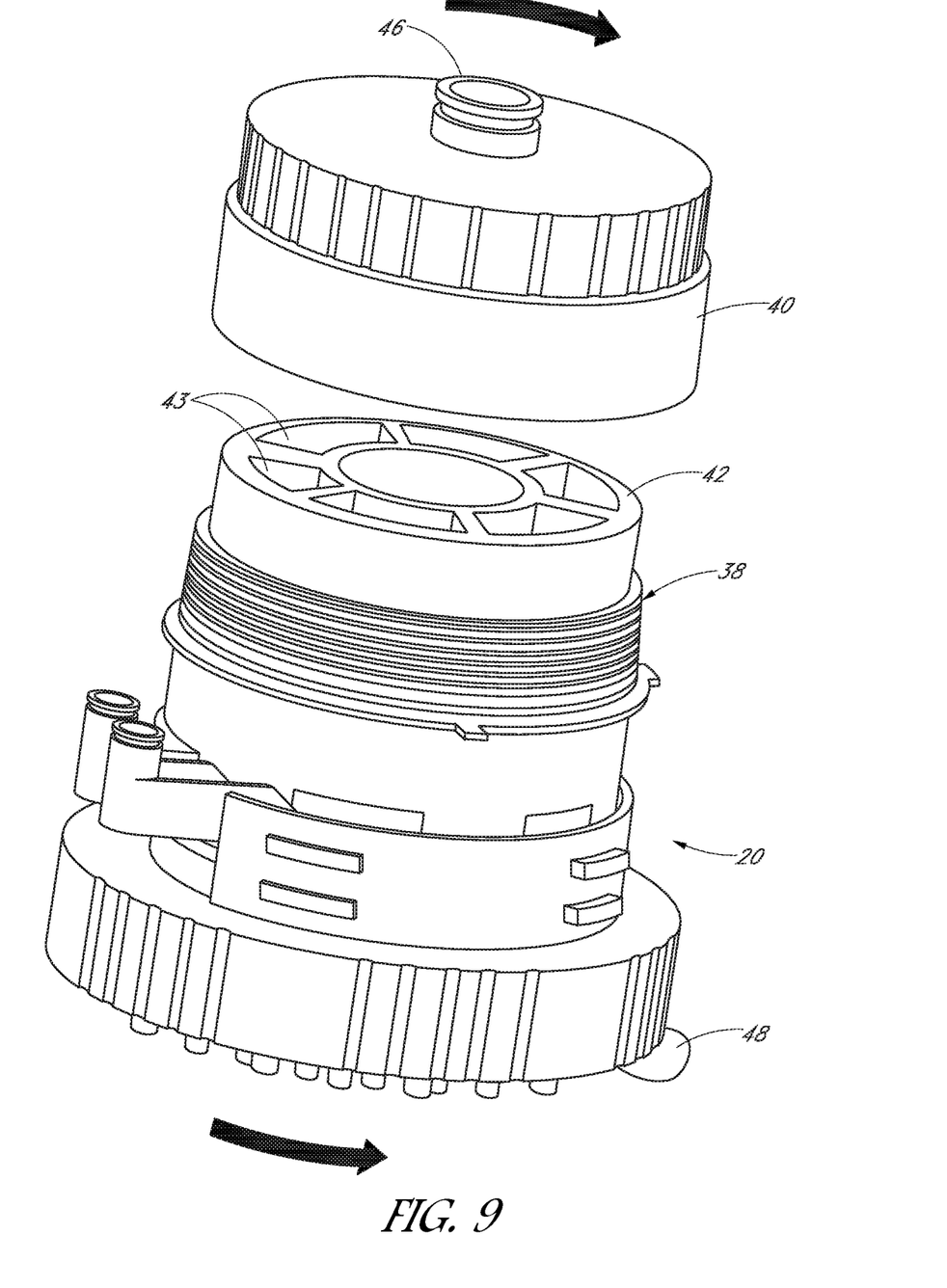
FIG. 9 is a partial exploded view of a removable nozzle assembly removed from the showerhead to illustrate a filter cartridge holding unit for holding a filter cartridge for insertion and removal from the offset water filter system of the showerhead.
Figure 10:
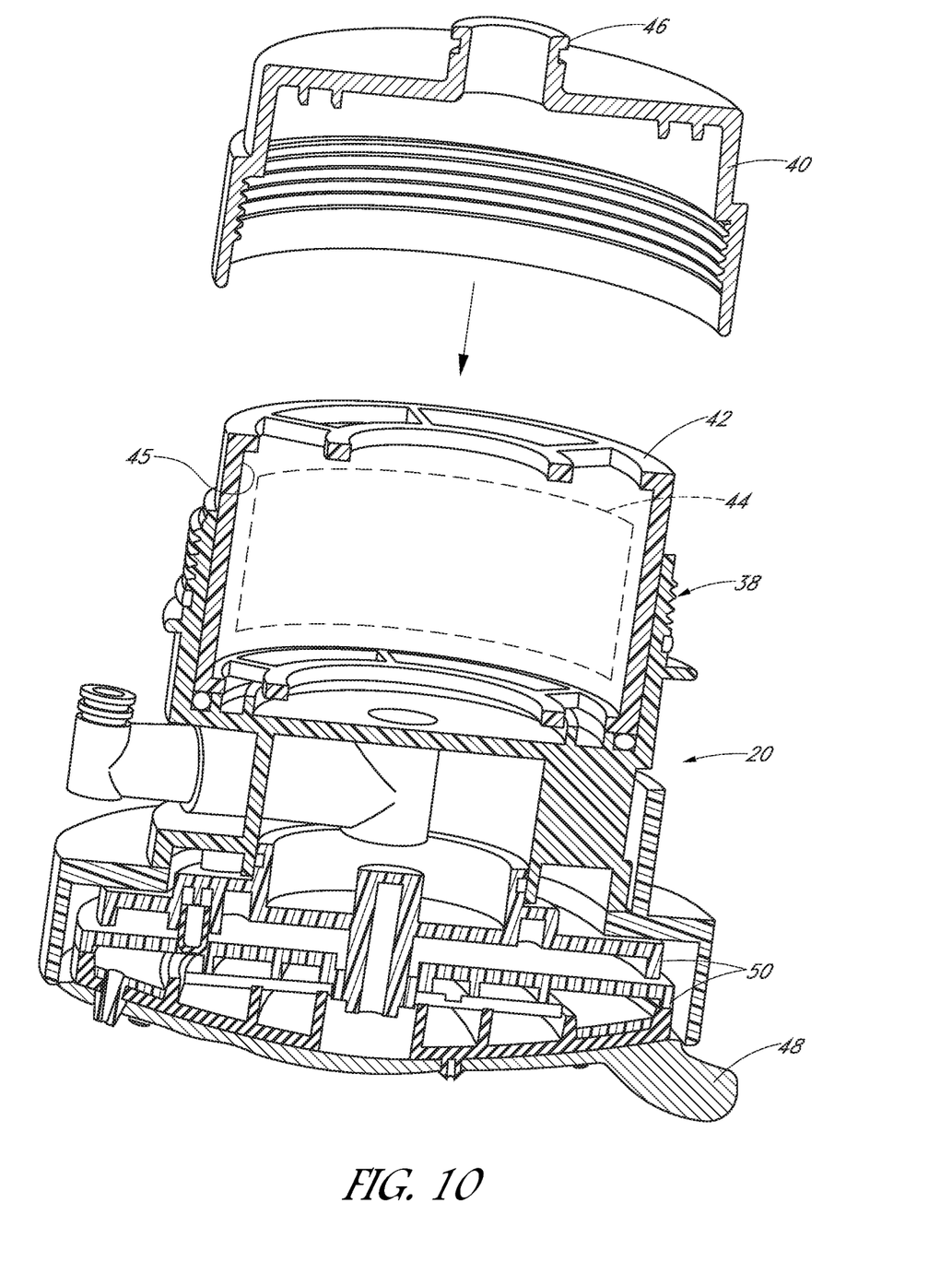
FIG. 10 is a cross-sectional view of FIG. 9.
Figure 11:
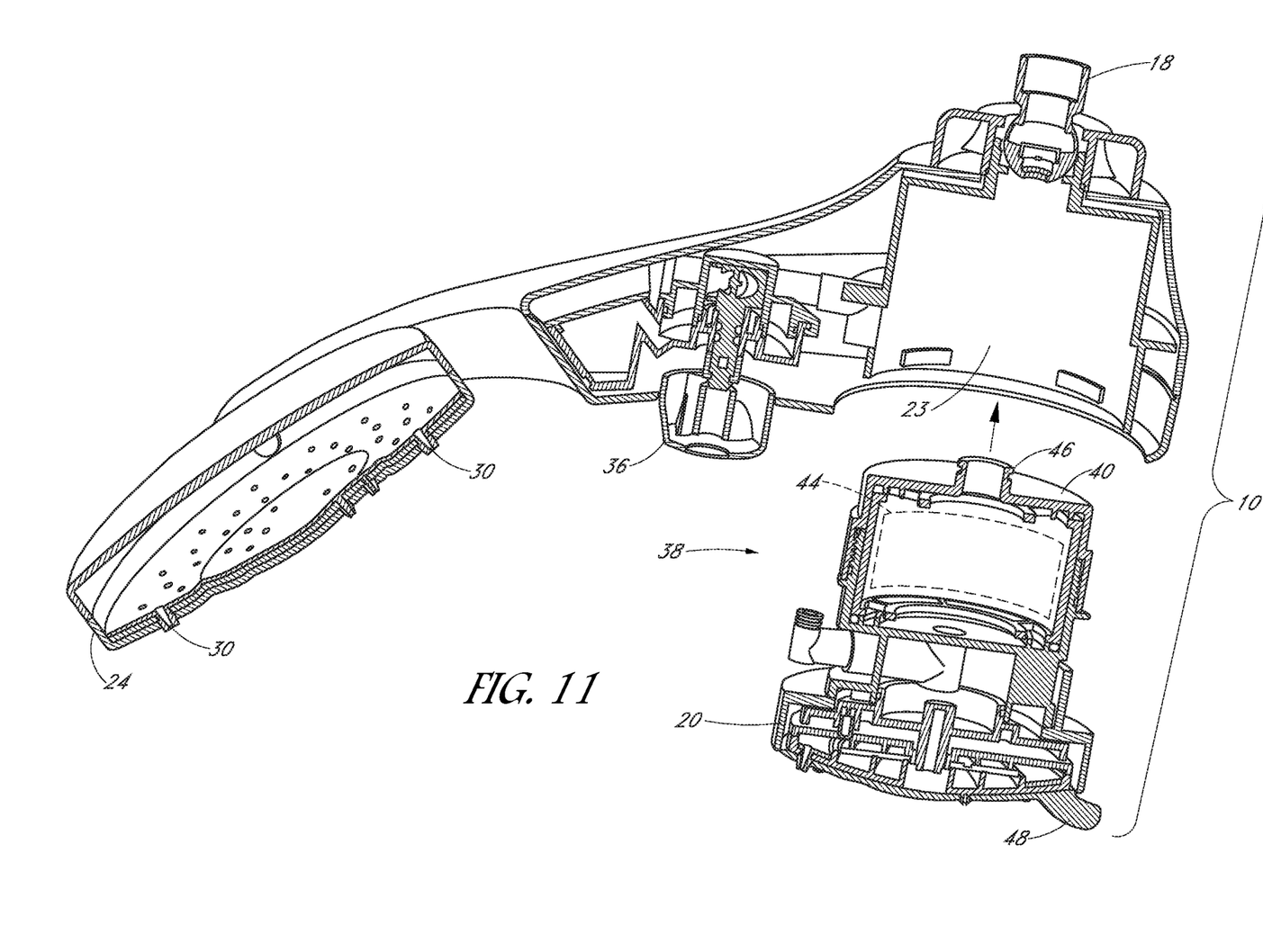
FIG. 11 is a partially exploded cross-sectional view of the showerhead of the present invention illustrating how the removable nozzle assembly and filter cartridge holding unit may be inserted through an opening in the front face of the showerhead into a hollow chamber forming part of the offset water filter system.

A second movable spray nozzle assembly or water outlet 24 is rotatably held in a pair of hollow arms 26, 28, at a second end of the showerhead. The arms 26, 28, could, of course, be extended outwardly until they form a complete surround for the rotatable nozzle assembly 24, without interfering in its movement. The second spray nozzle assembly 24 is substantially hollow (see FIGS. 11 and 12) with a plurality of openings 30 on one side thereof, located so that they face into a shower area when the showerhead is mounted on a shower arm. Additionally, the second spray nozzle assembly includes a pair of hollow bearing arms 32, 34 on opposed sides thereof which are sealing held in the hollow arms 26, 28 to allow the second spray nozzle assembly to be rotated and water to enter the nozzle assembly 24 and exit through the openings 30 (see FIGS. 4, 5 and 7.) The pair of hollow bearing arms 32, 34 allow the second spray nozzle assembly to be easily and sealingly rotated in the hollow arms 26, 28 by a user, to selectively change the direction of the flow of filtered water from the second spray nozzle assembly (see FIG. 8.)

A substantially hollow mode selector switch or knob 36 is held in a central portion of the front face 16 (see FIGS. 2-4, 7, 8, 11 and 12), between the first and second nozzle assemblies 20 and 24 to control flow of water to the second nozzle assembly 24.

As shown in FIGS. 9-12, the first nozzle assembly 20 is releasably or removably held in the hollow chamber 23 in the first end 22 of the body or housing 12. The first nozzle assembly 20 is shown with a water filter cartridge holding unit 38 secured thereto. The unit 38 has a screw off cap or top 40 which covers a removable holding element 42. A filter cartridge 44, shown in broken line, is inserted and held in a hollow interior 45 of holding element 42. This removable holding element 42 has a plurality of openings 43 formed therethrough to allow water to flow through the filter cartridge. Therefore, when first nozzle assembly and holding unit 38, with a filter cartridge held therein, is inserted and held in the hollow chamber 23 it forms the water filter system through which water entering through the inlet 18 flows before it exits through the first nozzle assembly 20, and/or through the moveable second nozzle assembly 24.

Figure 12:
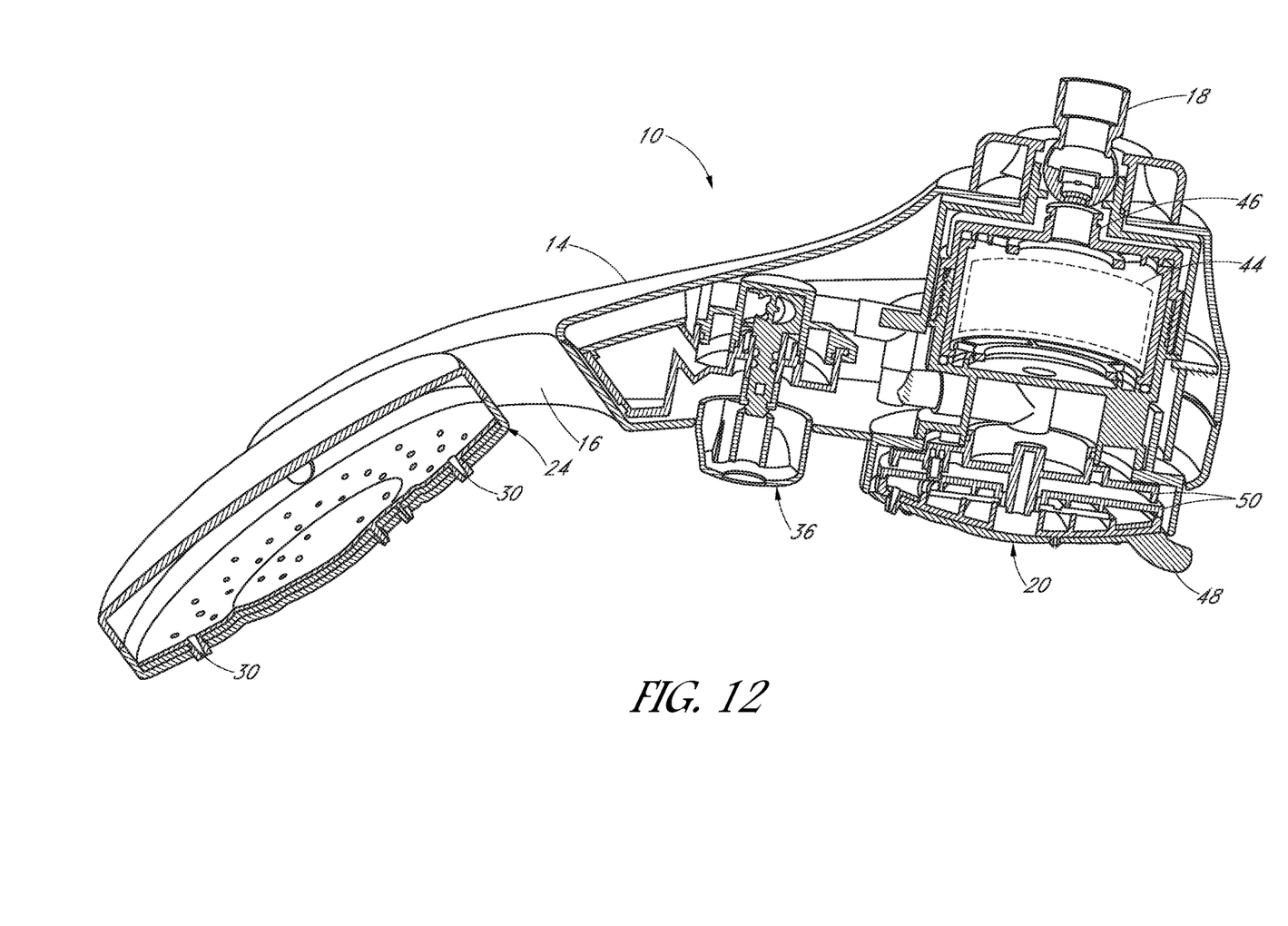
FIG. 12 is a cross-section view similar to FIG. 11, showing the removable nozzle assembly and filter cartridge holding unit mounted in the hollow chamber to complete the assembly of the showerhead and the offset water filter system.

As best shown in FIG. 12, when the showerhead 10 of the present invention is properly assembled with the hollow threaded inlet 46 in cap 40 holding the first spray nozzle 20 and cartridge holding unit in place and then mounted on a shower arm (not shown), in any known manner, water enters from the shower arm through the inlet 18 and flows through the hollow threaded inlet 46 in cap 40, through the filter cartridge 44.

First, if all the water flow control devices, including selector switch 36 are adjusted, water entering the showerhead from the shower arm goes through the filter cartridge 44 and through the first nozzle assembly 20, if not blocked by actuation of lever 48 and a plurality of plates 50 having openings therein secured to the lever, as described in the '565 application. Additionally, water, after passing through the filter cartridge 44, will flow through openings in the wall of hollow chamber 23 toward the selector switch 36. The selector switch 36 may be adjusted to block flow, or to preferably allow the water to flow into the second nozzle assembly 20 and out through the outlets 30.

It is to be understood that, if desired, the water filter cartridge holding unit 38 may be eliminated and the first nozzle assembly 20 modified to be similar to the water filter system set forth in the '565 application or this nozzle assembly may be provided with a different type holding where the filter cartridge 44 may be placed for insertion into the hollow chamber 23, It, therefore, can be seen that the present invention provides an improved, less cumbersome, easy to install and use multi-mode showerhead having multiple nozzle assemblies, in a substantially hollow housing with an offset integrated water filter assembly providing an integrated design.

Those skilled in the art will appreciate that various adaptations and modifications of the just-described preferred embodiment may be configured without departing from the scope and spirit of the invention. Therefore, it is to be understood that, within the scope of the appended claims, the invention may be practiced other than is specifically described herein.

What is claimed is:

1. A multi-mode showerhead and integrated offset water filter system, comprising;
   a substantially hollow housing having a front portion and a rear portion with a water inlet in the rear portion and a plurality of nozzle assemblies mounted in the front portion of the housing;
   a hollow water filter cartridge chamber formed at one end of the housing and fluidly connected with the water inlet;
   a removable water filter cartridge held in the hollow water filter cartridge chamber;
   a first nozzle assembly of the plurality of nozzle assemblies being removably mounted at said one end of the housing and fluidly connected to the hollow water filter cartridge chamber;
   a second nozzle assembly of the plurality of nozzle assemblies being rotatably mounted at a second end of said housing and fluidly connected to said hollow water filter cartridge chamber; and
   a multi-mode selector element held on the front portion and fluidly connected between the hollow water filter cartridge chamber and the second nozzle assembly for selectively directing water in the showerhead and out of the second nozzle assembly.

2. The multi-mode showerhead and integrated offset water filter system of claim 1, wherein the first nozzle assembly includes an adjusting means thereon to control the flow of filtered water out of the first nozzle assembly.

3. The multi-mode showerhead and integrated offset water filter system of claim 2 wherein the first nozzle assembly includes mechanical means formed thereon to enable the first nozzle assembly to be removably mounted in the housing.

4. The multi-mode showerhead and integrated offset water filter system of claim 3 wherein the second nozzle assembly is rotatably mounted in a pair of hollow arms at the second end of said housing.

5. The multi-mode showerhead and integrated offset water filter system of claim 4, further including a pair of hollow bearing arms connected to the second nozzle assembly to allow the second nozzle assembly to be rotated in the pair of hollow arms at the second end of said housing.

6. A multi-mode showerhead and integrated offset water filter system comprising:
   a housing having a front portion and a rear portion with a water inlet in the rear portion and at least two spray nozzle assemblies in the front portion, the housing further defining a hollow water filter cartridge chamber;
   a first spray nozzle assembly of the at least two spray nozzle assemblies being removably connected at one end of the housing and fluidly connected to the hollow water filter cartridge chamber;
   a removable water filter cartridge held in the hollow water filter cartridge chamber and selectively inserted and removed from the hollow water filter cartridge chamber when the first spray nozzle assembly is removed from the showerhead; and
   a multi-mode selector element held on the front portion and fluidly connected between the hollow water filter cartridge chamber and a second spray nozzle assembly of the at least two spray nozzle assemblies which is rotatably held in a second end of the front portion for selectively directing water exiting the multi-mode selector element out of the second spray nozzle assembly.

7. The multi-mode showerhead and integrated offset water filter system of claim 6 wherein the first nozzle assembly is removably held in said housing by mechanical securing means.

8. The multi-mode showerhead and integrated offset water filter system of claim 6 wherein the second nozzle assembly is rotatably held in a pair of hollow arms by a pair of hollow bearing arms connected to the second nozzle assembly, to allow the second nozzle assembly to be rotated in the pair of hollow arms.

9. A multi-mode showerhead and integrated offset water filter system comprising:
   a housing having a front portion and a rear portion with a water inlet in the rear portion at a first end of the housing and the front portion having a first spray nozzle assembly removably attached in the housing at the first end;
   a removable water filter cartridge held in a water filter cartridge chamber and selectively inserted and removed from the water filter cartridge chamber, which water filter cartridge chamber is fluidly connected to the water inlet and the first spray nozzle assembly;
   a multi-mode selector element held on the front portion between the first spray nozzle assembly and a second spray nozzle assembly and fluidly connected between the water filter cartridge chamber and the second spray nozzle assembly for selectively directing water exiting the multi-mode selector element out of the first and the second spray nozzle assemblies.

10. The multi-mode showerhead and integrated offset water filter system of claim 9, wherein the second spray nozzle assembly is rotatably mounted in a second end of the housing by a pair of hollow bearing arms rotatably held in hollow arms formed at the second end of the housing.

* * * * *